United States Patent [19]
Myburgh

[11] Patent Number: 6,082,879
[45] Date of Patent: Jul. 4, 2000

[54] COMBINATION LIGHT FIXTURE/HVAC DUCT/ADVERTISING CARD HOLDER FOR MASS TRANSIT VEHICLES

[76] Inventor: Herman Myburgh, 6995 Craddock La., Lascassas, Tenn. 37085

[21] Appl. No.: 09/274,343

[22] Filed: Mar. 23, 1999

Related U.S. Application Data

[60] Provisional application No. 60/079,115, Mar. 23, 1998.
[51] Int. Cl.[7] .................................................. B60Q 3/00
[52] U.S. Cl. ........................... 362/480; 362/479; 362/543; 362/253; 362/485; 362/544; 362/96; 362/812
[58] Field of Search .................................. 362/480, 479, 362/543, 253, 485, 544, 96, 812

[56] References Cited

U.S. PATENT DOCUMENTS

| | | | |
|---|---|---|---|
| 4,387,415 | 6/1983 | Domas | 362/479 |
| 5,006,966 | 4/1991 | Mikalonis | 362/483 |
| 5,038,256 | 8/1991 | Burkarth | 362/480 |
| 5,113,322 | 5/1992 | Mikalonis | 362/479 |
| 5,171,084 | 12/1992 | Burkarth | 362/480 |
| 5,420,763 | 5/1995 | Vanderhoof | 362/480 |
| 5,441,326 | 8/1995 | Mikalonis | 296/208 |
| 5,499,170 | 3/1996 | Gagne | 362/84 |
| 5,558,425 | 9/1996 | Pons et al. | 362/490 |
| 5,595,432 | 1/1997 | Vanderhoof | 362/480 |
| 5,857,758 | 1/1999 | Dealey, Jr. et al. | 362/551 |

*Primary Examiner*—Sandra O'Shea
*Assistant Examiner*—Ronald E. DelGizzi
*Attorney, Agent, or Firm*—Richard C. Litman

[57] ABSTRACT

A combination light fixture/HVAC duct/advertising card holder for public transportation vehicles such as buses and trains. The light fixture includes a lens having a transparent bottom portion and ribbed side portions for directing light downward towards the passengers and diffusing light sideways towards the windows and driver. The advertising panel forms part of the HVAC duct, with the vehicle side and roof forming the remainder. The advertising panel and light fixture are pivotally secured by a detachable hinge allowing them to either pivot downwards or be completely detached. The HVAC duct and advertising panel may further include other light fixtures, ventilation openings, speakers, or other comfort aids.

20 Claims, 13 Drawing Sheets

6,082,879

COMBINATION LIGHT FIXTURE/HVAC DUCT/ADVERTISING CARD HOLDER FOR MASS TRANSIT VEHICLES

CROSS-REFERENCE TO RELATED APPLICATION

This application claims the benefit of U.S. Provisional Patent Application Ser. No. 60/079,115, filed Mar. 23, 1998.

BACKGROUND OF THE INVENTION

1. Field of the Invention

The present invention relates to illumination and ventilation devices. Specifically, the invention is a combination light fixture, heating, ventilating, and air conditioning (HVAC) duct, and advertising panel for public transportation vehicles.

2. Description of the Related Art

Providing adequate light, comfortable conditions, and advertising locations within public transportation vehicles, while additionally avoiding interference with the driver's ability to safely operate the vehicle has been the goal of several other inventors' efforts. Light fixtures which provide light for passengers to read or move about the aisle must not interfere with the driver's ability to see out the windows. Efficient air duct systems are necessary to move heated or cooled air around the vehicle for the comfort of the passengers. The owners of such vehicles typically like to generate additional revenue by allowing advertisers to display information about their products within the vehicle, thereby enhancing the revenue generated by operating the vehicle. Despite the efforts of others towards these goals, the present inventor is unaware of any combination light fixture/HVAC duct/advertising panel combining the ease of installation, ease of servicing, ease of access to the various components, safety, and proper light distribution provided by the present invention.

U.S. Pat. No. 4,387,415, issued to Ben V. Domas on Jun. 7, 1983, describes a cornice lighting fixture. The fixture includes an outward concave curved panel with a light fixture for a fluorescent tube at the upper extremity. The panel, cooperating with the roof of the vehicle wherein the light fixture is installed, forms an air duct. The panel includes flanges for holding a sign, and the light fixture directs light onto the sign. No attempt is made to focus the light away from windows, resulting in dangerous reflections at night. Additionally, this fixture is made from a pultruded construction of resin and glass fibers, which have an excessively high burn rate. The burn rate can be reduced by the addition of chemicals, but the result is lethal smoke generation during a fire.

U.S. Pat. No. 5,006,966, issued to Lindas K. Mikalonis on Apr. 9, 1991, describes a light fixture for transit vehicles. The fixture includes a panel for displaying a sign. The fixture uses optical film to direct the light towards the floor and the opposite sign panel, and away from the windows. A similar invention is described in U.S. Pat. No. 5,113,322, issued to Lindas K. Mikalonis on May 12, 1992. Both of these patents describe the use of incandescent lamps, which are not as effective as fluorescent tubes in evenly distributing light. Additionally, both patents describe the use of a pultruded construction of resin and glass fibers, with the same disadvantages during a fire as described above.

U.S. Pat. No. 5,441,326, issued to Lindas K. Mikalonis on Aug. 15, 1995, describes a combined air conditioning duct, luggage compartment, and lighting fixture for mass transit vehicles. The air conditioning duct is defined between a panel extending from the vehicle roof, and the luggage rack is beneath this panel. The light fixture is within a channel-shaped beam supporting the luggage rack, and illuminates both the luggage rack and the passenger compartment.

U.S. Pat. No. 5,038,256, issued to Jack Burkarth on Aug. 6, 1991, describes a light fixture for a moving vehicle. The light fixture has a light and air diffusing panel adjacent to the fluorescent tubes. A nozzle applies high pressure air inside the light fixture, thereby drawing air upward through the diffusing panel and equalizing the temperature throughout the vehicle. Similarly, U.S. Pat. No. 5,171,084, issued to Jack Burkarth on Dec. 15, 1992, functions according to a similar principle.

U.S. Pat. No. 5,420,763, issued to Troy I. Vanderhoof on May 30, 1995, describes a lighting fixture with an adjacent sign panel for a vehicle. The sign panel, cooperating with the roof of the vehicle, forms an air duct. The light fixture includes a lens or diffuser for directing light into the passenger compartment and towards the sign panel, and a reflector for directing light away from the ceiling, reducing glare for the driver. The sign panel is secured by a pivot at its upper edge and a screw at its lower edge. A similar invention is described in U.S. Pat. No. 5,595,432, issued to Troy Vanderhoof on Jan. 21, 1997. Unlike the present invention, Vanderhoof's invention requires the use of numerous battens and ribs to support the fixture within a vehicle.

U.S. Pat. No. 5,499,170, issued to Bertrand Gagne on Mar. 12, 1996, describes a lighting track for public transportation vehicles.

U.S. Pat. No. 5,558,425, issued to Sylvain Pons and Daniel Segaud on Sep. 24, 1996, describes a fluorescent tube vehicle lighting system emitting light along a vertical and a horizontal path.

None of the above inventions and patents, taken either singularly or in combination, is seen to describe the instant invention as claimed. Thus a hvac duct/advertising card holder solving the aforementioned problems is desired.

SUMMARY OF THE INVENTION

The invention is a combination light fixture, heating, ventilation, and air conditioning (HVAC) duct, and advertising panel for public transportation vehicles.

The HVAC duct is defined between the invention and the side and roof of the vehicle. The invention has a fixed panel extending outward horizontally from the wall of a bus, with a brace extending from the fixed panel to the ceiling. Adjacent to the brace, the fixed panel includes a vertical lip, and a horizontal flange extending from the brace immediately above the lip. This lip and flange form one component of the invention's detachable hinge.

An advertising panel with an attached fluorescent light fixture connects to the fixed panel using the detachable hinge. The fluorescent light fixture may be attached either at the top or bottom of the advertising panel without changing the basic functioning of the invention. The bottom of the advertising card/light unit includes a hook dimensioned and configured to fit within the lip and flange of the fixed panel, forming the second component of the detachable hinge structure. The top of the advertising panel/light unit bolts to the ceiling of the vehicle. If the light fixture is on top, the bolts are preferably located beneath the fluorescent tube and snap-in light cover. If the light fixture is on the bottom, the bolts are preferably located beneath a snap-in cover. With the bolts in place, the advertising panel/light unit is held rigidly in place at both its top and bottom. With the bolts removed, the advertising panel/light unit can pivot downward, where it hangs suspended from the flange of the fixed panel, allowing easy access to the HVAC duct or light fixture. In the downward position, the advertising panel/light unit may be lifted completely away from the fixed panel.

The light fixture is dimensioned and configured to receive a fluorescent tube. An anodized aluminum housing/reflector extends the length of the advertising panel. Each side of the housing includes an inward extending flange down the entire length of the side. The lens includes a corresponding outward extending flange, allowing the lens to snap into place in the housing. The lens has a transparent or translucent bottom portion for allowing sufficient light to pass through for the convenience of the passengers, while the sides of the lens are ribbed to diffuse light, preventing glare and reflections on the vehicle's windows. An endcap fits within either end of the light housing, between the housing and lens, securing the fluorescent tube connection points in place. Snapping out the light fixture allows sliding a fluorescent tube into place between these connection points in the conventional manner. The housing also preferably includes at least one hook for securing the electrical wiring.

An electrical ballast is located adjacent to the housing. The ballast is well known in the art of fluorescent tubes, but will be described here to the extent necessary to understand its incorporation into the present invention. One of the two electrical wires going to the fluorescent tube goes directly to a first connection point. The second goes to the ballast. Two wires connect the ballast to the fluorescent tube, with one connecting to each of the tube's connection points. The ballast contains the fuse, which may be accessed through a hole in the advertising panel, or by pivoting the advertising panel/light unit downward. Adjacent light fixtures are wired in parallel.

The side of the housing adjacent to the advertising panel includes a slot for securing an advertising card over the panel. An elongated card holder extends across the other side of the advertising panel, thereby forming a second slot between itself and the advertising panel, opposite the slot in the light fixture. A card containing an advertising display is thereby retained between the opposing slots. The advertising panel itself is preferably curved along a horizontal axis so that it is concave when viewed from outside the duct, and convex when viewed from inside the duct.

The light fixture or advertising panel may include a stop request actuator along its length. Stop request actuators are well known and need no further description here.

The attachment of the fixed panel to the vehicle side, and of the advertising panel/light unit to the roof, is accomplished by bolts passing through the appropriate panel, a spacer, and then finally the vehicle. The spacer provides gaps between the panels and the vehicle side and roof, thereby allowing the heated or cooled air passing through the duct to enter the passenger compartment of the vehicle. The fixed panel or advertising panel may further have ventilation openings.

Additional light fixtures and/or speakers may be attached to either the fixed panel, or a panel having a speaker may replace the advertising panel. The advertising panel may also include a removable section to allow access to the HVAC duct without moving the light fixture. The removable section is secured using mating captive screws and J-nuts along one edge, and interlocking flanges created by removing layers of material from mating surfaces along the other edge.

A preferred and suggested material for the various panels within the light fixture/advertising panel/HVAC duct is a pressure laminate having an aluminum skin on both sides of a plastic core.

Installing the invention is done by first bolting the end of the horizontal panel and its brace to the vehicle, and then bolting the advertising panel/light unit to the roof, so that the mating detachable hinge portions support the lower end of the advertising/light unit. When a complete row of fixtures is installed in a vehicle, the advertising/light units can be pivoted downward and suspended in that position, allowing easy access to the light fixtures and inside of the HVAC duct for wiring the light fixtures. The fluorescent lights can be tested with the advertising/light units in this downward position, facilitating troubleshooting. Once the light fixtures have been successfully wired, the fluorescent tubes are removed, the advertising/light units can be pivoted upward and bolted to the ceiling, and the fluorescent tubes and lenses reinstalled for use.

Repair of the light fixtures can be accomplished by removing the lens and fluorescent tube, or the panel covering the advertising/light unit's bolts, unbolting the advertising/light unit, and rotating the panels downward. If serious damage to the light fixtures or advertising panels occurs, the panels can easily be detached and replaced due to the detachable hinge.

Accordingly, it is a principal object of the invention to provide a combination light fixture, HVAC duct, and advertising panel for public transportation vehicles which provides a standard design usable in a wide variety of vehicles without modifying the design or installation.

A second object of the invention is to provide access to the light fixture and HVAC duct using a continuous, detachable hinge.

It is another object of the invention to provide a light fixture for public transportation vehicles which can be wired while the light fixtures are hanging downward, facilitating access to the wiring during testing.

It is a further object of the invention to provide a combination light fixture, HVAC duct, and advertising panel fabricated from durable, easily manufactured materials.

Still another object of the invention is to provide a combination light fixture, HVAC duct, and advertising panel fabricated from materials which are safe during a fire within the vehicle.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a combination lighting fixture, HVAC duct, and advertising panel for public transportation vehicles such as buses and trains. The invention comprises a horizontal panel, an advertising panel, and a light fixture, with the HVAC duct defined between the horizontal panel, advertising panel, and the side and roof of the vehicle.

Figure 1:
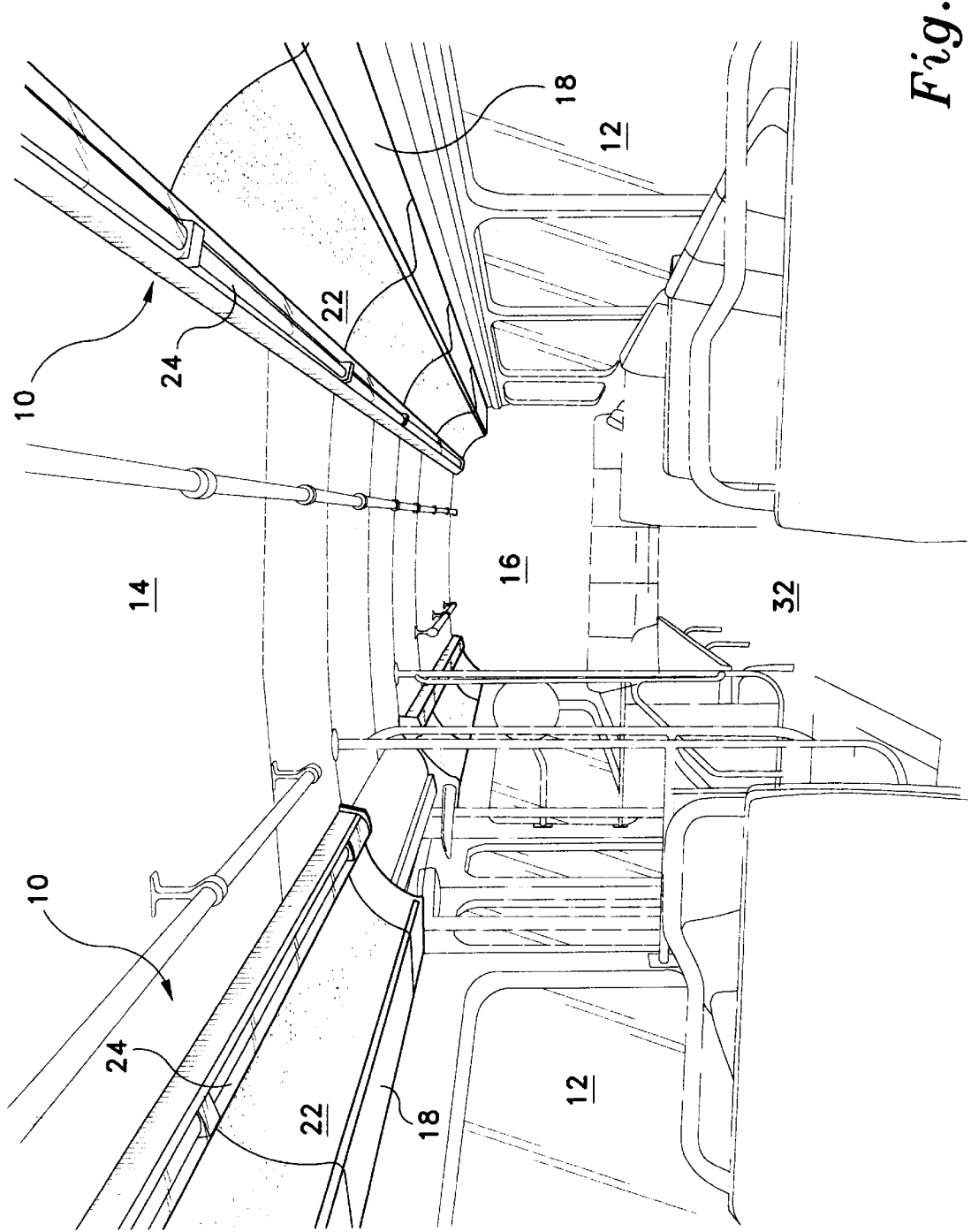
FIG. 1 is an environmental, perspective view of a combination light fixture/HVAC duct/advertising card holder according to the present invention.
Figure 2:
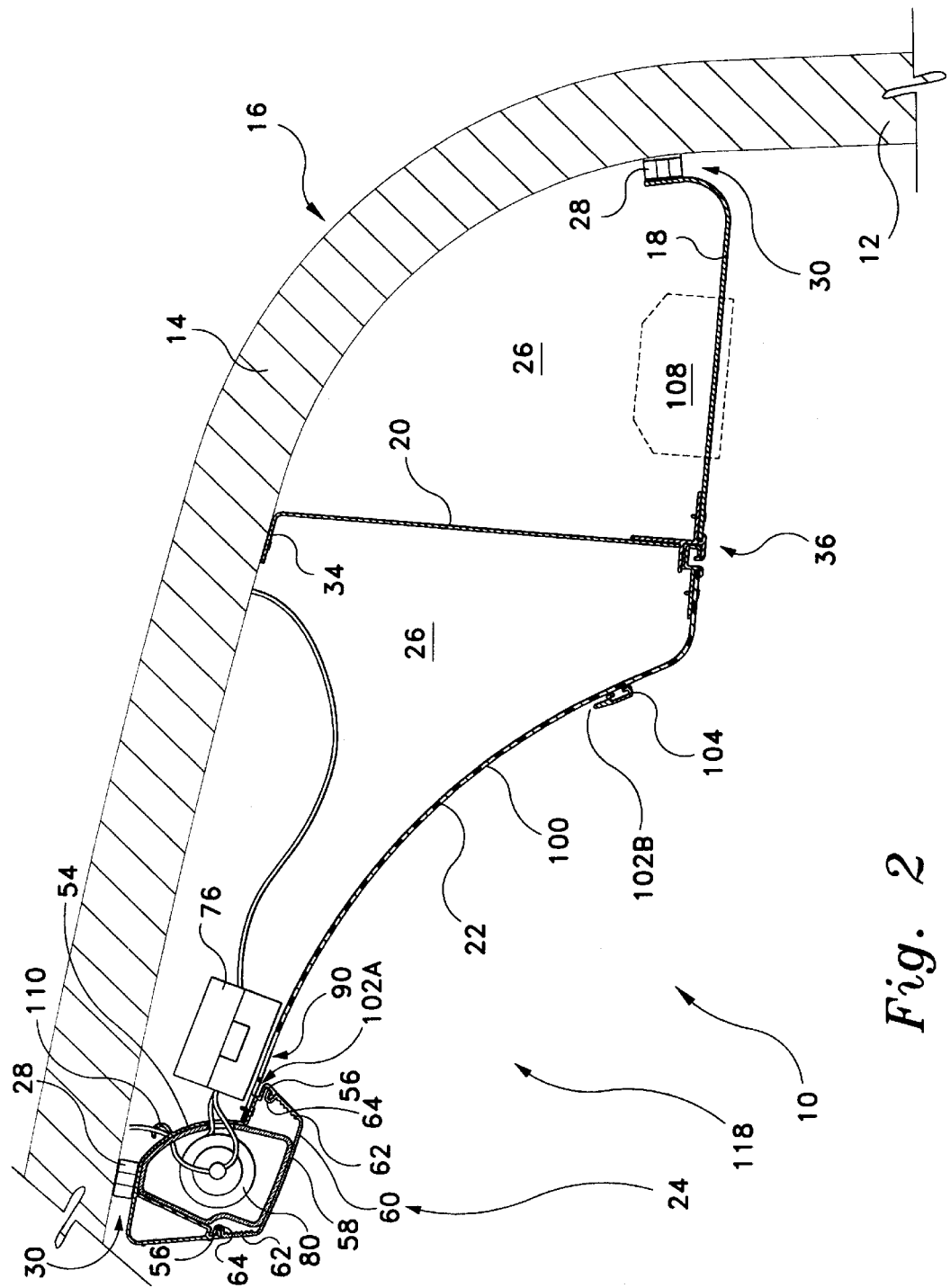
FIG. 2 is a side view of a combination light fixture/HVAC duct/advertising card holder according to the present invention.
Figure 3:
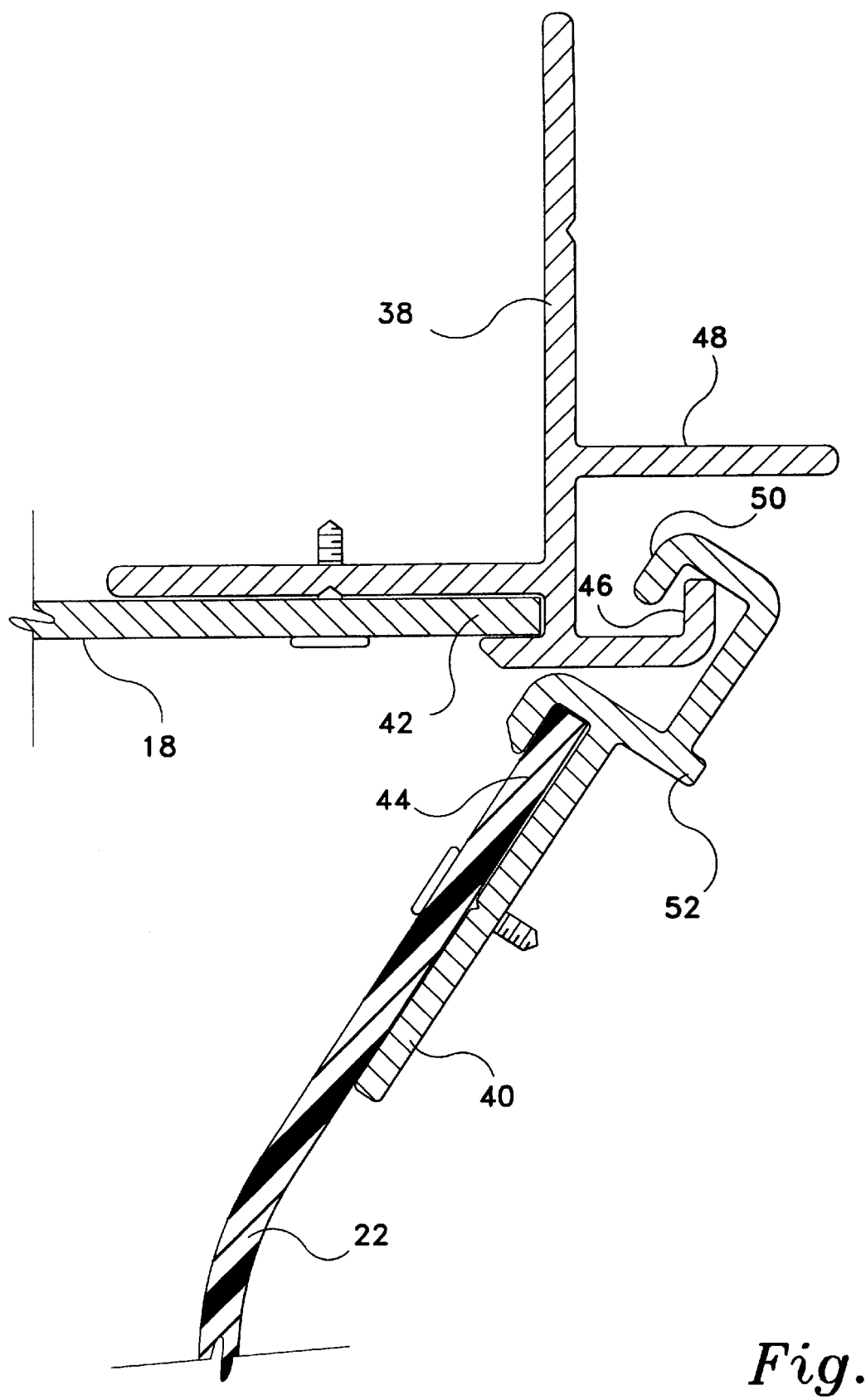
FIG. 3 is a side view of a detachable hinge for a combination light fixture/HVAC duct/advertising card holder according to the present invention, showing the advertising panel in a hanging position.

Referring to FIG. 2, the invention 10, illustrated in conjunction with the side 12 and roof 14 of public transportation vehicle 16, includes a horizontal panel 18, brace 20, advertising panel 22, and light fixture 24. HVAC duct 26 is defined between the side 12, roof 14, horizontal panel 18, and advertising panel 22. The invention 10 is attached to vehicle 16 by threaded bolts passing through spacers 28, thereby creating air outlets 30 between spacers 28 for heated or cooled air to enter the passenger compartment 32 (FIG. 1) of the vehicle. The top flange 34 of brace 20 is also attached to roof 14, providing additional support for the invention 10.

The light fixture 24 is best illustrated in FIGS. 2, 5, 6, 7, 8, and 13. The light fixture 24 includes a reflector 54 secured to advertising panel 22. The reflector 54 is preferably made from anodized aluminum reflector for maximum durability, ease of manufacture, and recyclability. The reflector 54 includes an inwardly extending flange 56 along each side. The lens 58 includes a smooth transparent or translucent bottom surface 60, and a pair of sides having ribbed surfaces 62 comprising prismatic light diffusers. Each side of lens 58 defines a channel 64, dimensioned and configured to receive the flanges 56. Lens 58 is preferably flexible, so that it can snap into place on reflector 54, with flanges 58 secured inside channels 64, thereby forming a means for removably securing said lens to said reflector.

Each side of light fixture 24 includes and end cap 66, fitting between the reflector 54 and lens 58. Each end cap 66 supports one fluorescent tube socket 68a or 68b. By removing lens 58, a light source 80, which is preferably a fluorescent tube or solid light bar, can be secured between the opposing sockets 68a,68b in the conventional manner.

Figure 5:
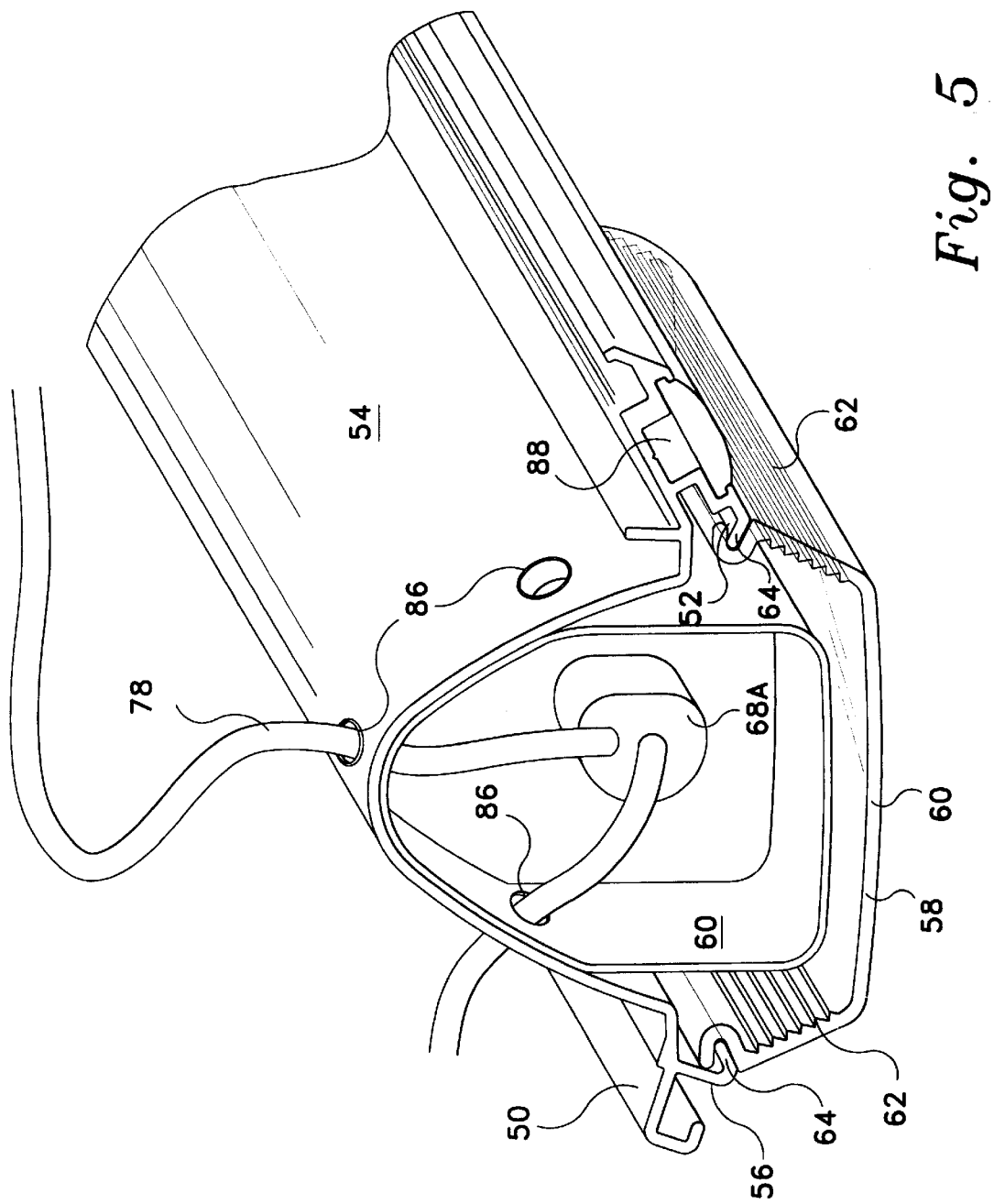
FIG. 5 is an end perspective view of a combination light fixture/HVAC duct/advertising card holder according to the present invention.
Figure 10:
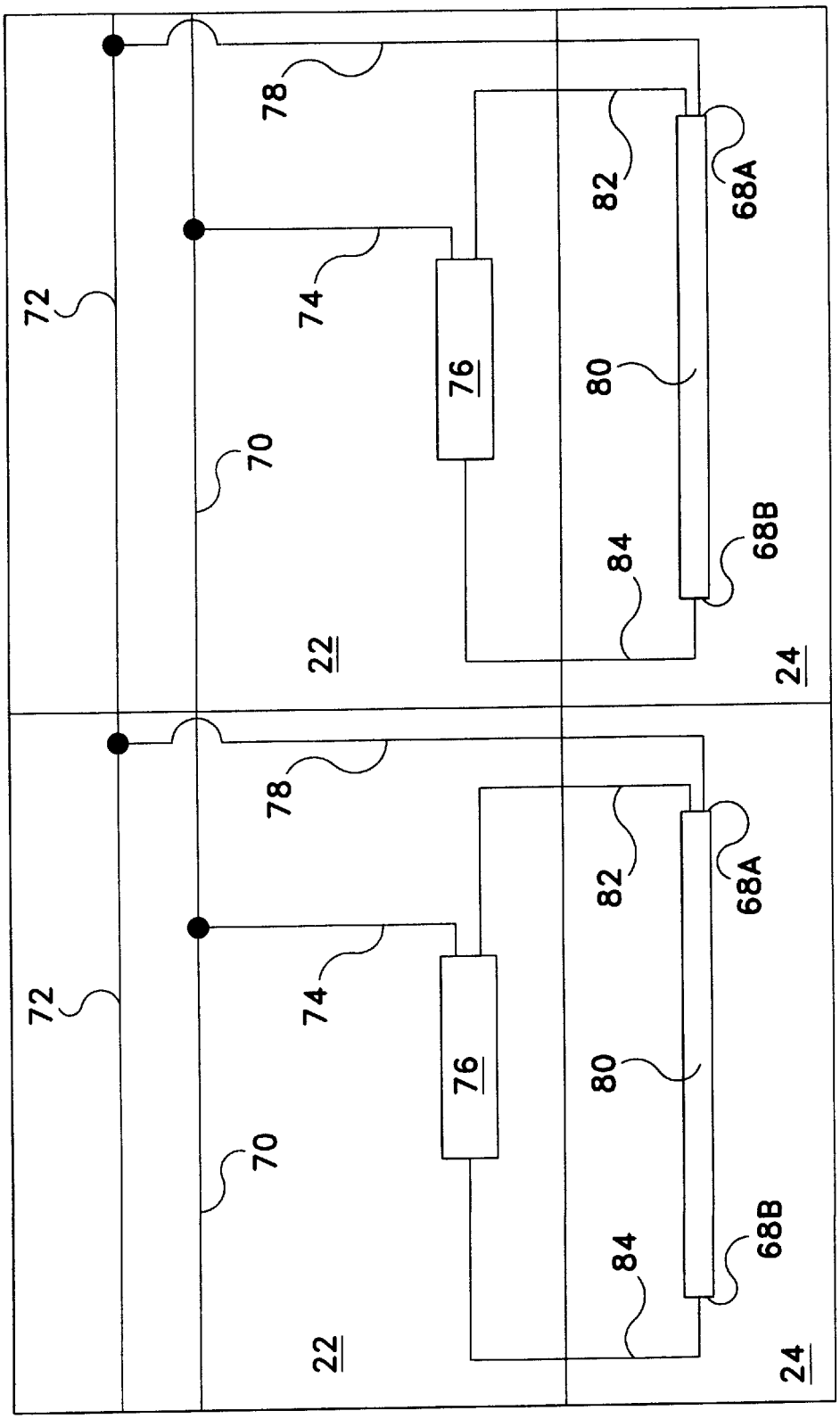
FIG. 10 is a diagrammatic view of the electrical wiring supplying power to a series of combination light fixture/HVAC duct/advertising card holders according to the present invention.
Figure 13:
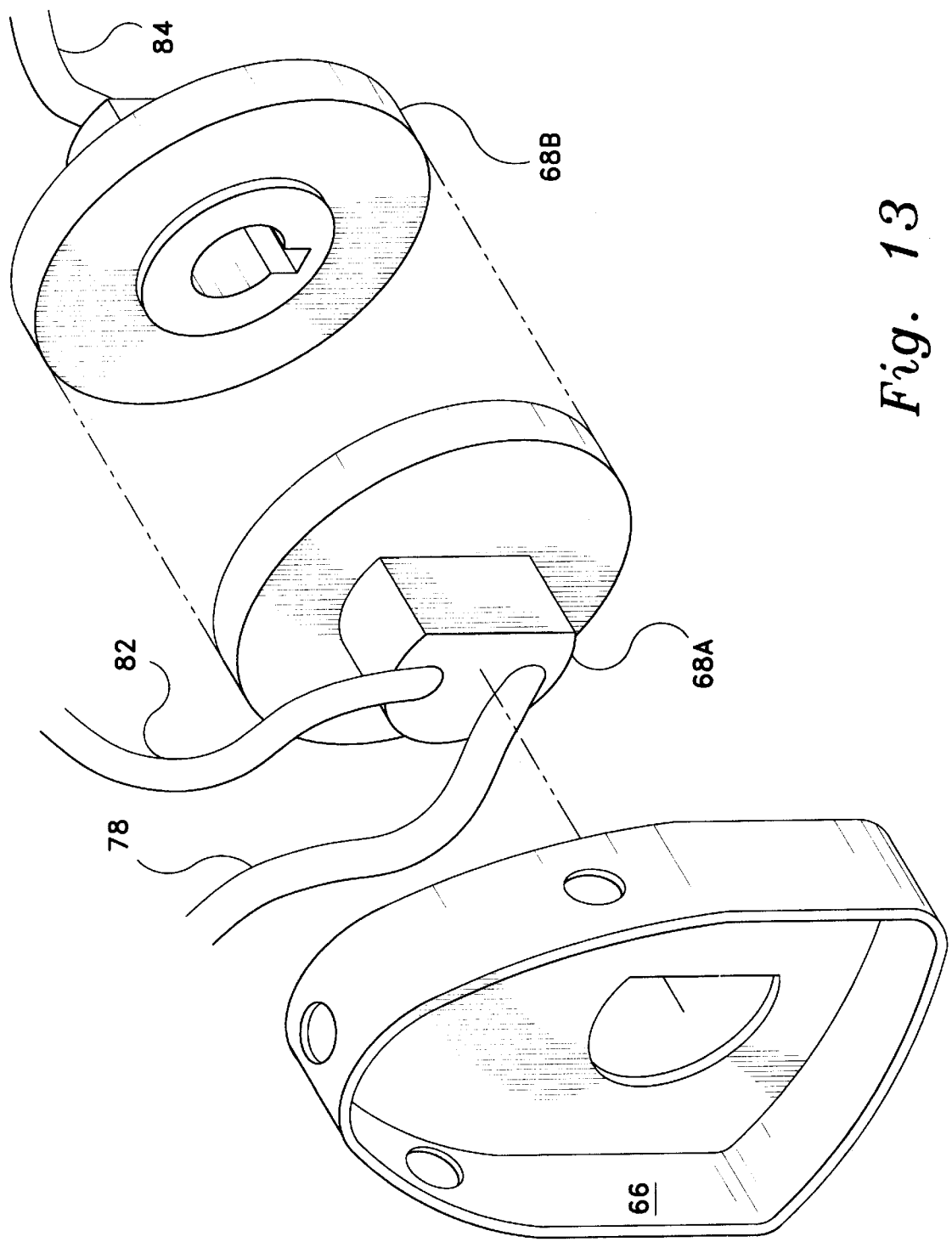
FIG. 13 is an exploded end perspective view of a combination light fixture/HVAC duct/advertising card holder according to the present invention.

The electrical wiring providing power to a fluorescent tube is well known, but is described herein to the extent necessary to show its interaction with the present invention, and how the present invention facilitates access to the wiring's various components. Referring to FIGS. 5 and 10, a negative power supply wire 70 and positive power supply wire 72 supply electricity to the system, with the adjacent light fixtures 24 each wired in parallel. Wire 74 connects the negative power wire 70 to the electronic ballast 76 (well known, and contains a fuse for its light fixture). Wire 78 connects positive power wire to socket 68a. Wire 82 connects socket 68a to ballast 76, and wire 84 connects ballast 76 to socket 68b. Both wires 78,82 connecting to socket 68a are thereby positive, and the wire 84 connecting to socket 68b is negative. Referring specifically to FIG. 5, it can be seen that wires 78,82 pass through the hollow center fasteners 86 connecting reflector 54 and end cap 66, and FIG. 13 illustrates how end cap 66 defines an aperture dimensioned and configured to socket 68. Although only endcap 68a is illustrated, endcap 68b is joined to reflector 54 using hollow center fasteners through which wire 84 passes. A hook 110 may be provided for securing the wiring in its desired location.

Figure 6:
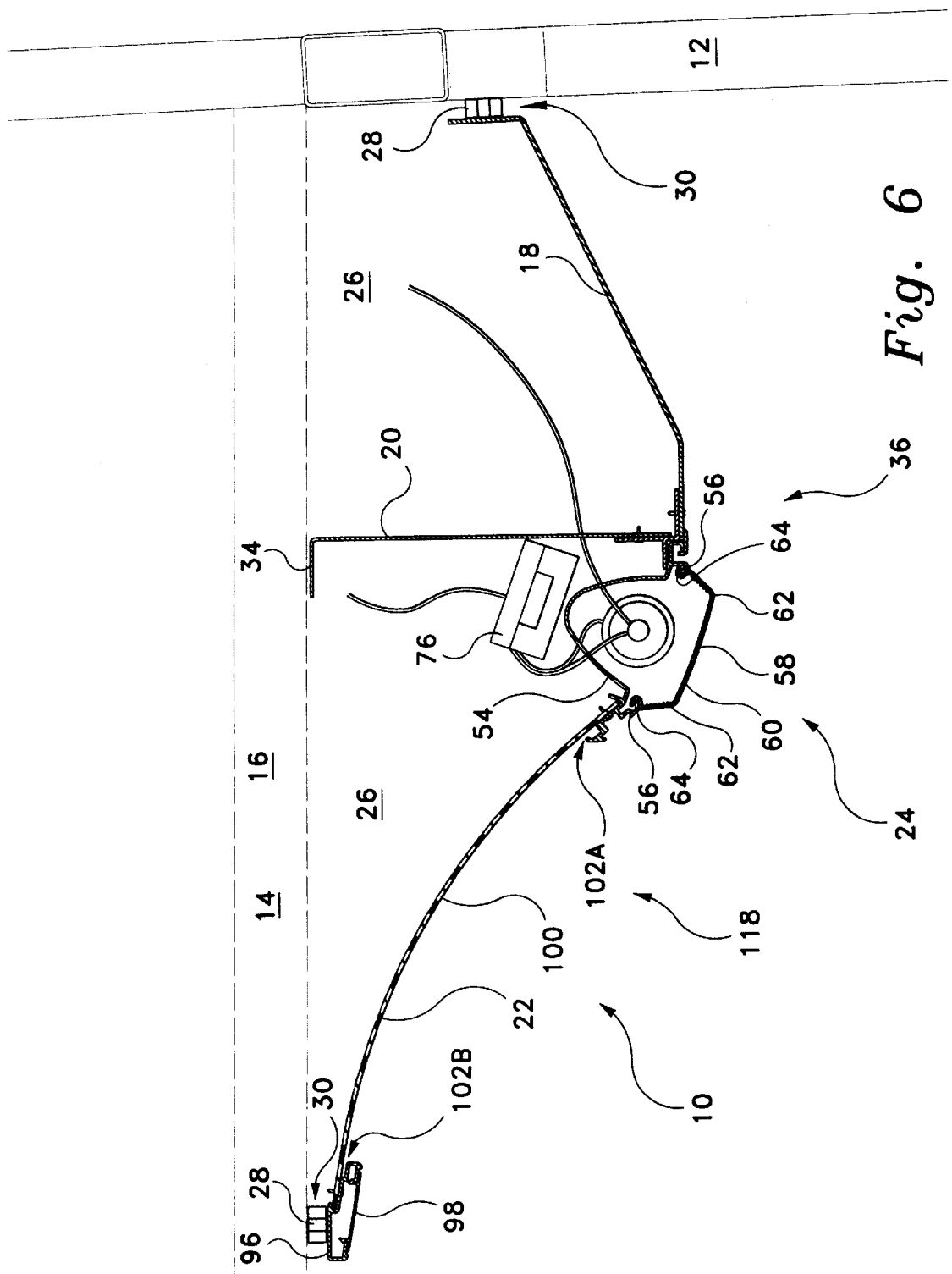
FIG. 6 is a side view of a second embodiment of a combination light fixture/HVAC duct/advertising card holder according to the present invention.
Figure 7:
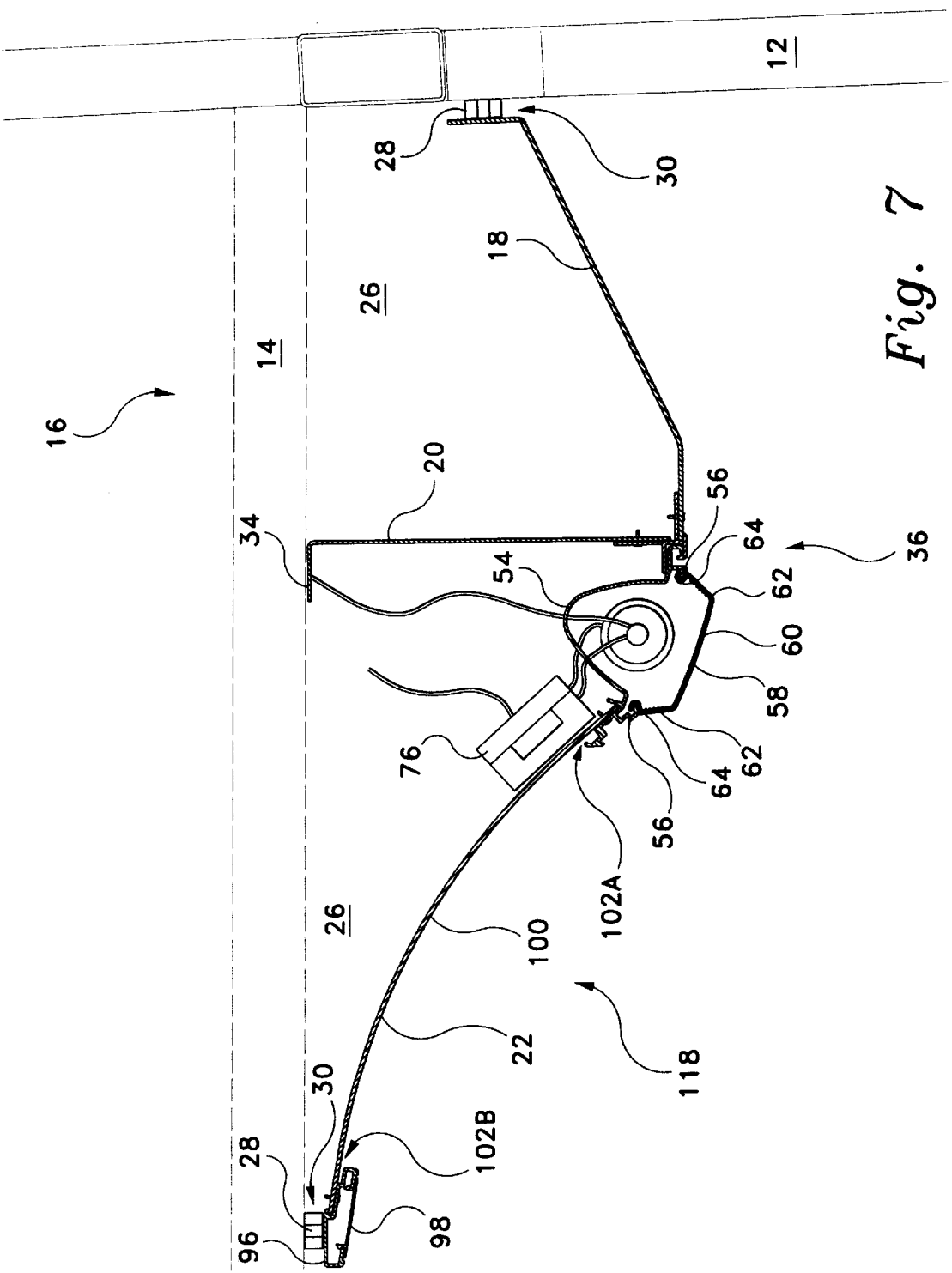
FIG. 7 is a side view of a second embodiment of a combination light fixture/HVAC duct/advertising card holder according to the present invention, showing a different location for the electrical ballast.
Figure 8:
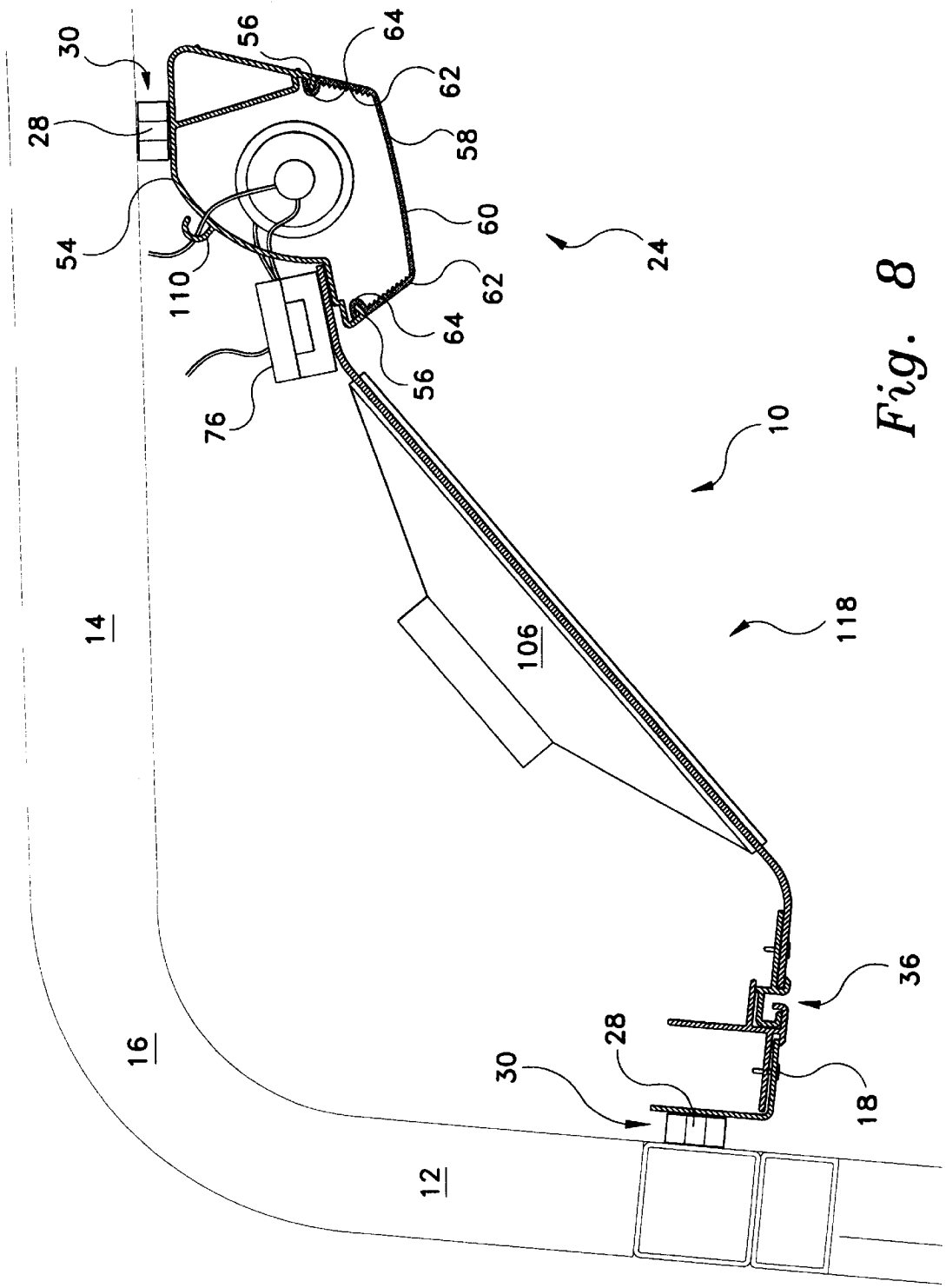
FIG. 8 is a side view of a third embodiment of a combination light fixture/HVAC duct according to the present invention, having a speaker substituted for the advertising card holder.

The light fixture 24 may be located along the top edge of the advertising panel 22, as illustrated in FIGS. 2 and 8, in which case spacers 28 are preferably located directly between light fixture 24 and ceiling 14. Ballast 76 may preferably be located directly on top of advertising panel 22, so that aperture 90 within advertising panel 22 facilitates access to a fuse within ballast 76. Alternatively, light fixture 24 may be located along the bottom edge of advertising panel 22, between advertising panel 22 and detachable hinge 36, as illustrated in FIGS. 6 and 7. Ballast 76 may then be located either directly on top of advertising panel 22, so that an aperture within advertising panel 22 permits access to the fuse (FIG. 7), or on top of light fixture 24 (FIG. 6), wherein the fuse is accessed by rotating advertising panel 22 downward. The light fixture 24 of FIG. 5 corresponds to the configuration of FIGS. 6 and 7, but otherwise has the same elements as the light fixture of FIGS. 2 and 8. Spacers 28 are located directly under attachment strip 96, located across the top edge of advertising panel 22, with a snap-in cover 98 mating with attachment strip 96 to cover the bolts. Regardless of whether light fixture 24 is above or below advertising panel 22, the light fixture 24 and advertising panel 22 form a single rigid light/advertising unit 118.

FIG. 5 illustrates a light fixture 24 including a stop request actuator 88 extending parallel to light fixture 24. Stop request actuator 88 is well known and need not be described further.

Figure 9:
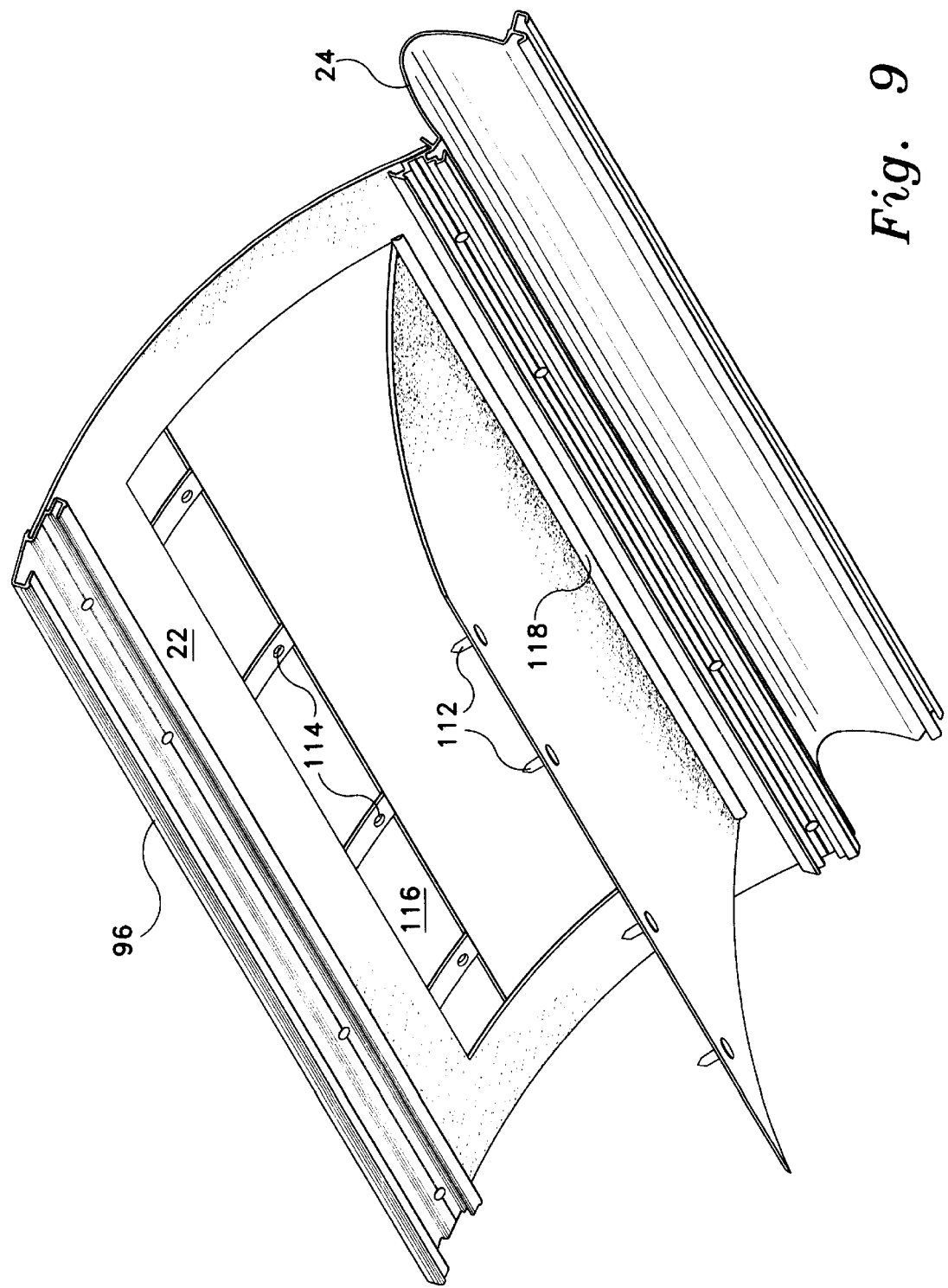
FIG. 9 is a bottom perspective view of a combination light fixture/HVAC duct/advertising card holder according to the present invention, showing an alternative means of accessing the duct.
Figure 11:
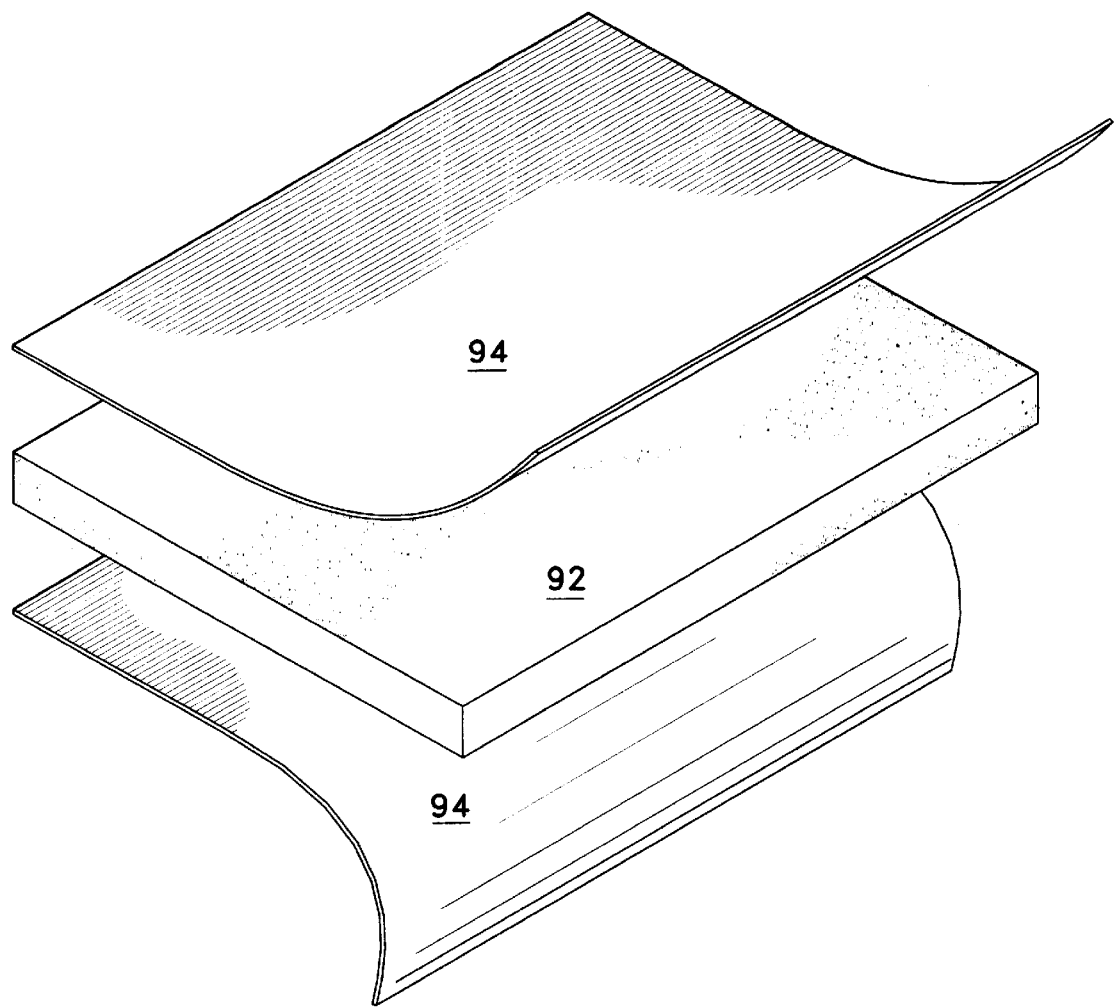
FIG. 11 is an exploded perspective view of a panel used to fabricate a combination light fixture/HVAC duct/advertising card holder according to the present invention.

Advertising panel 22 may take one of several different forms, with four preferred and suggested configurations illustrated herein. Advertising panel 22 is preferably curved around a horizontal axis, so that surface 100, facing the passenger compartment, is concave. Referring briefly to FIG. 11, the preferred and suggested materials for the advertising panel itself are illustrated. A plastic core 92 having an aluminum skin 94 on either side is preferred. A pressure laminate is also suggested. Advertising panel 22 should also include means for securing an advertising card, preferably a pair of opposing horizontal channels 102*a*, 102*b*. One of these channels 102*a* is preferably defined along one edge of light fixture 24, between advertising panel 22 and reflector 24. An opposing channel 102*b* may be defined by attachment strip 96, or alternatively by an elongated card support 104, in conjunction with the advertising card 22. Alternatively, advertising panel 22 may include a speaker 106, illustrated in FIG. 8. Lastly, advertising panel 22 may include hatch 110, illustrated in FIG. 9, for allowing access to the HVAC duct 26 without moving light fixture 24 or advertising panel 22. Preferably, captive screws 112 mate with J-nuts 114 on backing panel 116, secured to the rear of advertising panel 22, to secure hatch 110 in place. The opposite end 118 of hatch 110 is secured by removing opposing layers of aluminum skin 94 from the advertising panel 22 and extending the aluminum skin 94 on hatch 110, so that the overlapping layers of aluminum skin 94 and core 92 secure hatch 110 in place. The exposed plastic core 92 is flexible, so that the combination of the exposed core 92 of advertising panel 22 and the aluminum skin 94 of hatch 118 results in a live hinge, thereby eliminating the necessity of installing an additional hinge.

Figure 4:
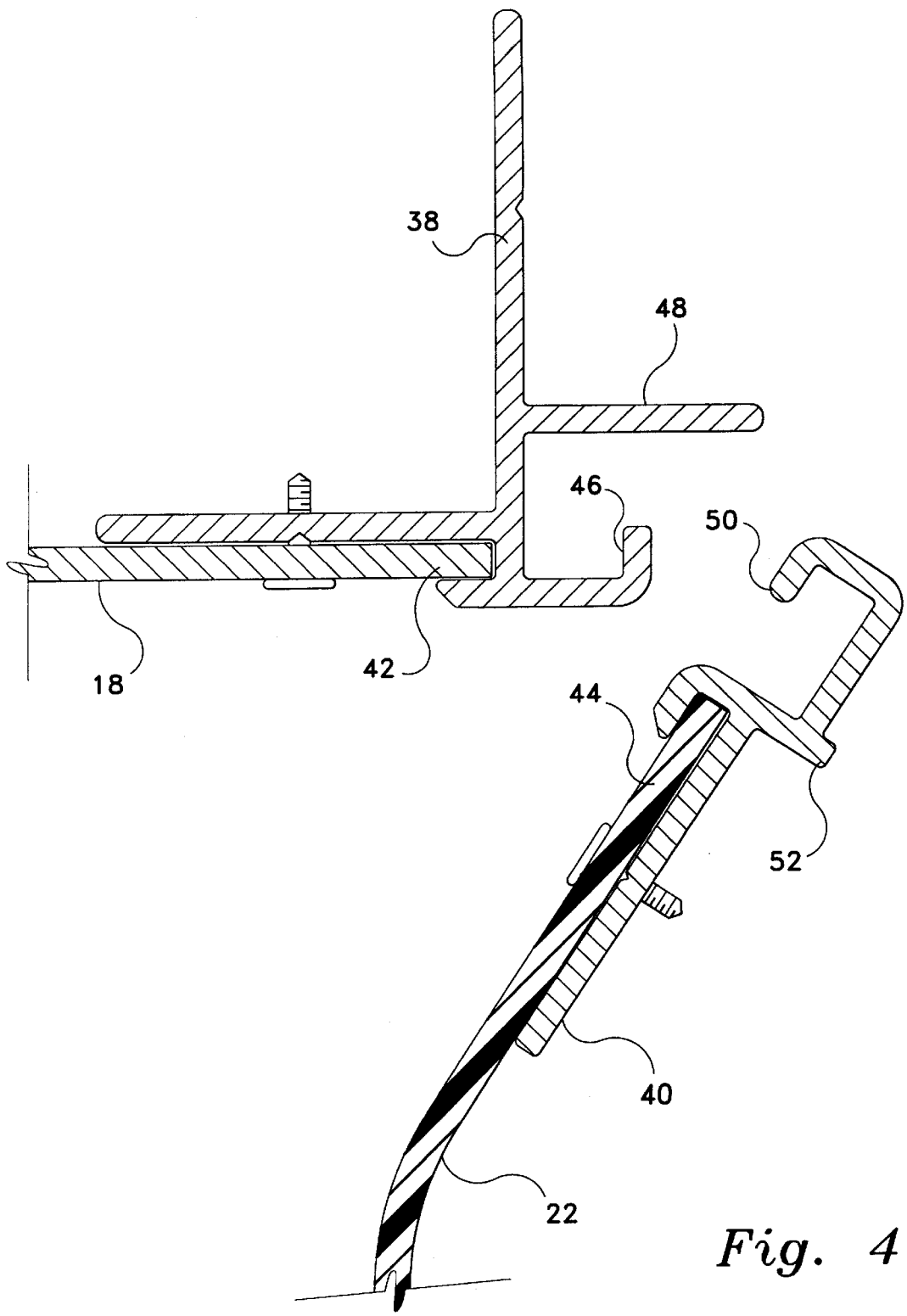
FIG. 4 is a side view of a detachable hinge for a combination light fixture/HVAC duct/advertising card holder according to the present invention, showing the advertising panel detached.
Figure 12:
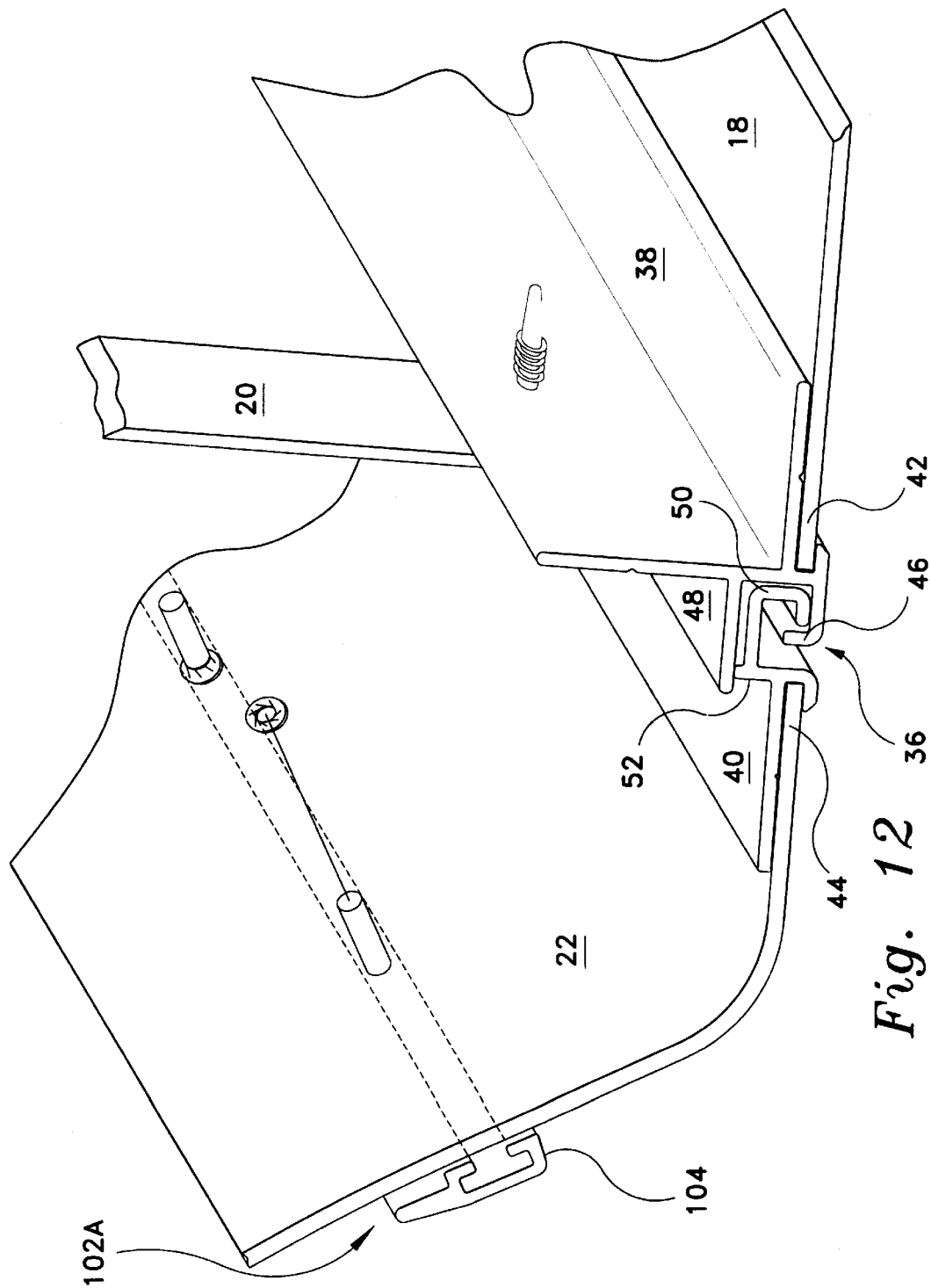
FIG. 12 is a side perspective view of a combination light fixture/HVAC duct/advertising card holder according to the present invention.

Referring to FIGS. 2, 3, 4, 6, 7, 8, and 12, the structure of detachable hinge 36, connecting horizontal panel 18 and light/advertising unit 118 is shown. Female hinge component 38 attaches to horizontal panel 18, and male hinge component 40 either attaches to advertising panel 22 or is one component of light fixture 24. Female hinge component 38 defines a channel 42, into which the inboard edge of horizontal panel 18 fits. Likewise, if the male hinge component 40 attaches to advertising panel 22, male hinge component 40 defines a channel 44, into which advertising panel 22 fits. Brace 20 is bolted to female hinge member 38. Female hinge member 38 includes an upward-directed lip 46, extending along its entire length, having the configuration of a hook when viewed from one end. A horizontal flange 48 extends outward a small distance above lip 46. Male hinge member 40 includes a corresponding lip 50, extending along its entire length and having the configuration of a hook when viewed from one end. The lip 50 of male hinge member 40 is dimensioned and configured to fit between the lip 46 and flange 48, with upward projection 52 extending upward from lip 50 to abut flange 48. This hinge secures horizontal panel 18 and light/advertising unit 118 together with little relative movement when light/advertising unit 118 is secured in its upper position (FIGS. 2, 12). When access to the light fixture 24 or HVAC duct 26 is desired, light/advertising unit 118 may be rotated downward to the position shown in FIG. 3, wherein the light/advertising unit 118 is suspended downward from the horizontal panel 18. When the light/advertising unit 118 hangs downward, it may also be completely detached, as illustrated in FIG. 4.

Other comfort aids may be added to the invention as necessary. An example is the second light fixture 108, illustrated in phantom in FIG. 2, which may be located within the horizontal panel 18. This second light fixture provides a source of light closer to the seated passengers, which may be used for reading. The light 108 may be controlled by the individual passengers in a well-known manner.

To install the invention in a public transportation vehicle, each individual light fixture/HVAC duct/advertising panel 10 is installed immediately adjacent to other identical units, extending down the length of the vehicle 16, and along both sides of the vehicle 16. Each individual fixture 10 is first bolted to the vehicle in a similar manner. Horizontal panel 18 is first installed by bolting it to vehicle side 12, with the bolt passing through spacer 28, and by bolting the upper flange 34 of brace 20 to ceiling 14. The advertising panel 22 and light fixture 24 are then attached as a single unit, with the mating components 46,50 of detachable hinge 36 joined together, and either light fixture 24 (if the light fixture is on top of the advertising panel) or attachment strip 96 (if the light fixture is below the advertising panel) is bolted to ceiling 14, with at least one spacer 28 therebetween.

With all fixtures 10 bolted in place, the wiring supplying the electrical power can be installed. The advertising panel 22 and light fixture 24 are hinged downward and suspended using detachable hinge 36, leaving the spacers 28 attached to the ceiling 14. Negative power supply wire 70 and positive power supply wire 72 are extended down the length of each side of the vehicle 16, within the HVAC duct 26 where they are inaccessible to passengers. Wire 74 is connected between the negative supply wire 70 and the ballast 76, and wire 78 is connected between the positive supply wire 72 and the socket 68*a*. The remainder of the wiring of each individual unit will typically have been performed as that unit was assembled, so it is already complete prior to installation of the light fixture 24 inside a vehicle. Once a fixture is wired, fluorescent tube or solid light bar 80 is installed between sockets 68*a*,68*b*. Testing and troubleshooting can be performed with the light fixture 24 and advertising panel 22 suspended downward, allowing easy access to the wiring. Once wiring is complete, light fixture 24 and advertising panel 22 are returned to their upward position. If the light fixture 24 is on top of advertising panel 22, fluorescent tube 80 is removed so that the bolts can be installed through reflector 54, the fluorescent tube is then reinstalled, and lens 58 snapped into place. If the light fixture 24 is below advertising panel 22, lens 58 may optionally be installed before securing attachment strip 96 to spacers 28. Cover 98 is then snapped into place. Advertising cards may be inserted between the opposing channels 102*a*,102*b* for display within the passenger compartment 32 as desired. The resulting vehicle interior is illustrated in FIG. 1.

It is to be understood that the present invention is not limited to the embodiments described above, but encompasses any and all embodiments within the scope of the following claims.

I claim:

1. A combination light fixture, HVAC duct, and advertising card holder for public transportation vehicles, the vehicles having at least one side and a roof, said combination light fixture, HVAC duct, and advertising card holder comprising:

a horizontal panel;

at least one spacer bolted between said horizontal panel and the side of the vehicle;

a single, rigid light/advertising unit comprising:

an advertising panel having a top edge, a bottom edge, and means for securing an advertising card;

a light fixture having a reflector with a pair of sides, a lens with a bottom and a pair of sides, means for removably attaching said lens to said reflector, and at least one socket for securing a light source; and a detachable hinge connecting said horizontal panel and said light/advertising unit;

at least one spacer bolted between said combination light fixture, HVAC duct, and advertising card holder and the roof of the vehicle.

2. The combination light fixture, HVAC duct, and advertising card holder according to claim 1, wherein said light source is selected from the group consisting of fluorescent tubes and solid light bars.

3. The combination light fixture, HVAC duct, and advertising card holder according to claim 1, wherein said sides of said lens include prismatic light diffusers.

4. The combination light fixture, HVAC duct, and advertising card holder according to claim 1, wherein said reflector is made from anodized aluminum.

5. The combination light fixture, HVAC duct, and advertising card holder according to claim 1, wherein said means for removably attaching said lens to said reflector comprise:

a flange along each side of said reflector; and a channel along each side of said lens, said channels being dimensioned and configured to receive said flanges of said reflector.

6. The combination light fixture, HVAC duct, and advertising card holder according to claim 1, wherein said light fixture includes an electrical ballast.

7. The combination light fixture, HVAC duct, and advertising card holder according to claim 6, wherein said electrical ballast contains a fuse.

8. The combination light fixture, HVAC duct, and advertising card holder according to claim 7, wherein said advertising panel includes an aperture permitting access to said fuse.

9. The combination light fixture, HVAC duct, and advertising card holder according to claim 1, wherein:

said light fixture is located at said advertising panel's top edge; and said light fixture is bolted to said at least one spacer bolted between said combination light fixture, HVAC duct, and advertising card holder and the roof of the vehicle.

10. The combination light fixture, HVAC duct, and advertising card holder according to claim 9, wherein said means for securing an advertising card include:

a channel defined between said reflector and said advertising card; and an elongated card support defining a channel between said elongated card support and said advertising card, opposing said channel defined within said reflector.

11. The combination light fixture, HVAC duct, and advertising card holder according to claim 1, wherein:

said light fixture is located at said advertising panel's bottom edge;

said advertising panel's top edge includes an attachment strip, said attachment strip being bolted to said at least one spacer bolted between said combination light fixture, HVAC duct, and advertising card holder and the roof of the vehicle.

12. The combination light fixture, HVAC duct, and advertising card holder according to claim 11, wherein said means for securing an advertising card include:

a channel defined between said reflector and said advertising panel; and a channel defined between said attachment strip and said advertising panel opposing said channel defined within said reflector.

13. The combination light fixture, HVAC duct, and advertising card holder according to claim 11, further comprising a cover mating with said attachment strip.

14. The combination light fixture, HVAC duct, and advertising card holder according to claim 1, further comprising a second light fixture within said horizontal panel.

15. The combination light fixture, HVAC duct, and advertising card holder according to claim 1, further comprising a speaker.

16. The combination light fixture, HVAC duct, and advertising card holder according to claim 1, wherein said advertising panel is made from a material selected from the group consisting of a plastic core with a metal skin, and a pressure laminate.

17. The combination light fixture, HVAC duct, and advertising card holder according to claim 1, wherein said advertising panel further includes a hatch.

18. The combination light fixture, HVAC duct, and advertising card holder according to claim 17, wherein said hatch is secured by a live hinge comprising overlapping layers of aluminum skin and flexible core.

19. The combination light fixture, HVAC duct, and advertising card holder according to claim 1, wherein said detachable hinge further comprises:

a female hinge component attached to said horizontal panel, said female hinge member having an upward-directed lip having the configuration of a hook when viewed from one end, and a horizontal flange extending outward above said lip; and a male hinge component attached to said light/advertising unit, said male hinge component having a lip with the configuration of a hook when viewed from one end, said male hinge component being dimensioned and configured to fit within said female hinge component.

20. The combination light fixture, HVAC duct, and advertising card holder according to claim 19, wherein said male hinge component includes an upward projection abutting said female hinge component's flange.

* * * * *